United States Patent Office 3,517,816
Patented June 30, 1970

3,517,816
FLUID TREATMENT APPARATUS
Johannes Hoppen, Schwelm, Germany, assignor, by mesne assignments, to U.S. Philips Corporation, New York, N.Y., a corporation of Delaware
Filed Jan. 16, 1968, Ser. No. 698,227
Claims priority, application Germany, Jan. 21, 1967, G 49,049, G 49,050
Int. Cl. B01d 27/02
U.S. Cl. 210—266  3 Claims

ABSTRACT OF THE DISCLOSURE

A water softener having a cylindrical variable volume conversion tank for containing ion exchange conversion material. The softener is operative in any orientation and particularly adaptable for use within domestic appliances.

The invention relates to water softeners and in particular to those for use in dish-washers, and having a substantially cylindrical conversion tank containing ion exchange material, an inlet chamber and an outlet chamber having a perforated bottom.

Water softeners of the above type are known and this construction of a water softener has proved to be satisfactory as far as flow technology and exchange ratios, particularly with a length-diameter ratio of 10:1. However, it is often not possible to use such a water softener in a domestic washing machine since it has to be incorporated in upright position, that is to say with a vertical cylinder axis. This is because the known devices have an expansion volume at the upper end in order to obtain a satisfactory seal in the direction of flow without by-pass effect at the peripheral zones and also in order to allow the ion exchange material to expand in accordance with the charged or discharged condition. The ion exchange material is formed by ion exchangers and subsequent to exhaustion it is regenerated by means of a more or less concentrated sodium chloride solution, in which case the volume varies. For reasons of space, water softeners used in domestic dish-washers often have a square shape or the shape of a short cylinder, which involves considerable disadvantages in respect of flow and exchange.

The invention has for its object to provide a water softener of simple construction, which can be incorporated in a vertical or a horizontal position or in any oblique position. Optimum flow and exchange conditions are obtained in any orientation. The water softener according to the invention is therefore particularly suitable for being incorporated in dish-washers or similar domestic apparatus.

The invention is characterized in that the conversion tank has a volume which matches the volume of the converting mass contained therein.

An advantageous embodiment of the invention is characterized in that the conversion tank comprises a sheath formed by a base out of rubber, plastic or similar elastic material. The length-diameter ratio is preferably 10:1 in the devices according to the invention and in any case, taking the ion exchange material into consideration, it is such that satisfactory flow and exchange conditions are obtained.

According to the invention optimum conditions are obtained in this embodiment by contracting the rubber or plastic hose towards the axis of the conversion tank in a Venturi-tube fashion, so that in the unstretched state it has a smaller diameter than the hose connections on the perforated bottoms. Owing to the Venturi-tube-like constriction of the flow section a particularly advantageous flow profile is obtained, so that during regeneration under pressure or under the operational conditions the tubular sheath can perform so to say a respiration, which results in advantageous position changes of the bodies of the ion exchange material. It is, however, not necessary to operate the device so that the rubber or plastic hose is contracted in a Venturi-tube fashion. The filling may be such that the hose bulges out, in this case advantageous exchange and flow conditions can be obtained, if the length is properly chosen. The most favourable length can be found easily empirically.

A second advantageous embodiment of the invention is characterized in that at least one of the perforated bottoms is arranged so as to be slidable and is supported with resect to the ion exchange material by the pressure of a spring. The length-diameter ratio is also in this embodiment preferably 10:1 and at any rate, taking the ion exchange material concerned into consideration, it is such that optimum technical conditions with regard to flow and exchange are obtained.

A preferred construction of this embodiment having excellent reliability of operation is characterized in that the slidable perforated bottom is arranged in an envelope and sealed to the conversion tank by means of one or more sleeves connected with the outer side of the envelope. The slidable perforated bottom is easily movable under the action of the spring, and the seal is secured by a number of sleeves.

The advantages provided by the invention reside principally in that the device according to the invention for softening water is of simple construction and can be oriented in a vertical, horizontal or oblique position, and in any position optimum flow and exchange conditions are ensured. Volume variations of the converting material occurring during charge or regeneration or resulting from different filling masses are immediately compensated.

The invention will now be described with references to two embodiments shown in the drawing.

Figure 1:
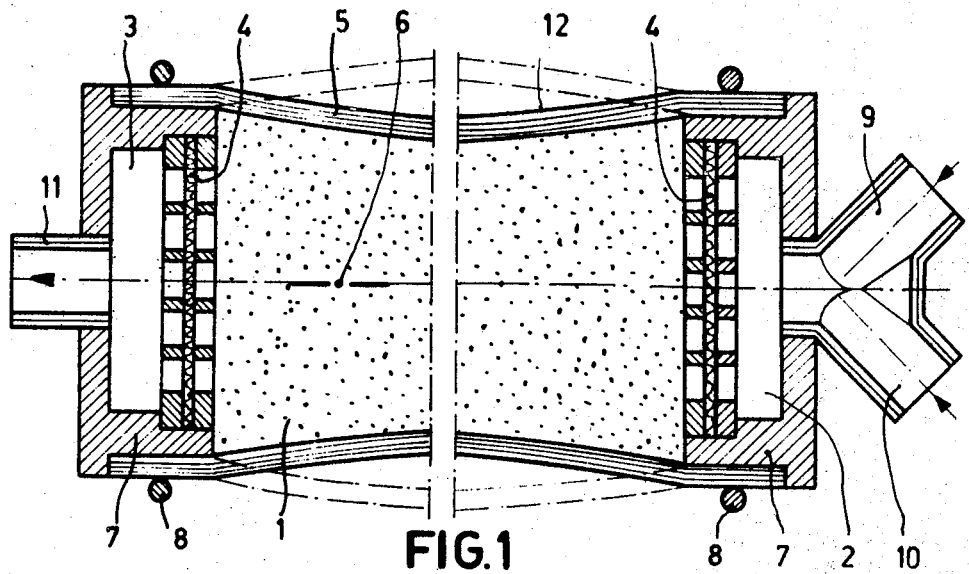
FIG. 1 is a longitudinal sectional view of a first embodiment.

The water softener shown in FIG. 1 is intended particularly for use in dish-washers and comprises mainly a substantially cylindrical conversion tank 12 containing converting material 1, an inlet chamber 2 and an outlet chamber 3, having a perforated bottom 4. According to the invention the conversion tank has a sheath 5 formed by a rubber or plastic hose, which is stretched on the ion exchange material 1 and has a taut periphery. In the preferred embodiment of the invention shown here the rubber or plastic hose 5 is contracted in Venturi-tube fashion towards the axis 6 of the conversion tank, so that the hose 5 has in the unstretched state a smaller diameter than the hose connections at 7, surrounding the perforated bottom 4. The hose connections at 7 are formed by a simple holding member equipped with a hose strap 8.

The water to be softened is supplied through a tube socket 9 and the regenerating means are supplied through the tube socket 10.

The softened water is derived on the other side from the tube socket 11. Also the variations of the ion exchange material 1 occurring during charging or regeneration are compensated by the expansion of the rubber or plastic hose 5. Peripheral expansions of the rubber or plastic hose 5 are indicated in FIG. 1 by dot-and-dash lines.

Figure 2:
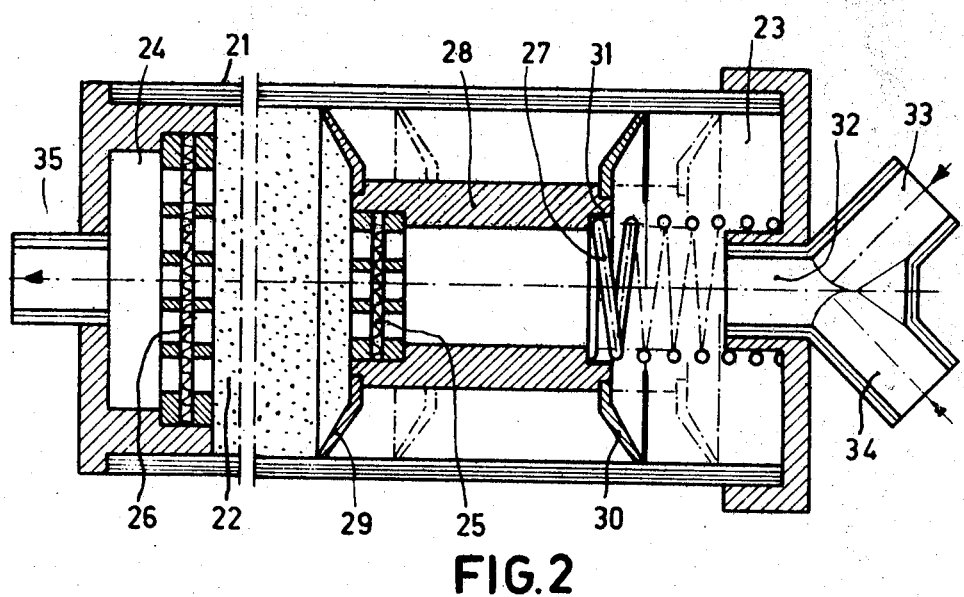
FIG. 2 is a longitudinal sectional view of a second embodiment.

The device shown in FIG. 2 is also intended particularly for use as a water softener in dish-washers. It comprises mainly a substantially cylindrical conversion tank 21 containing ion exchange material 22, and an inlet chamber 23 and an outlet chamber 24 having perforated bottoms 25 and 26 respectively. According to the invention at least one of the perforated bottoms 25, 26 is arranged so as to be slidable and is supported with respect to the ion exchange material 22 by means of a spring 27. In this device and in a preferred embodiment of the invention the slidable perforated bottom 25 is inserted into an envelope 28, with which sleeves 29, 30 of rubber or plastic are connected in the proximity of the upper and lower edges. The envelope 28 has a depression 31 for receiving the helical spring 27, which surrounds an inlet socket 32. The hard water is supplied through the tube socket 33 and the regenerating substance is supplied through the tube socket 34, branched from the former. The softened water is derived on the other side of the device from the tube socket 35.

Volume variations of the ion exchange material 22 can be compensated by the slidable perforated bottom 25 and FIG. 2 shows in broken lines a second position of this slidable bottom 25. Differences of the filling masses are also compensated by this slidable bottom 25. The length-diameter ratios are chosen so that optimum flow exchange conditions are obtained.

What is claimed is:

1. A fluid treatment apparatus comprising a variable volume conversion tank for containing an ion exchange conversion material, an inlet chamber on one side of the coversion tank for respectively introducing the fluid to be treated and the regenerative fluid, an outlet chamber for discharging the purified fluid, perforated members located on both sides of the conversion material for retaining same within the conversion tank, and means for providing volumetric expansion of the conversion tank in response to the internal pressure generated by the conversion material during the discharging and charging of the conversion material, said means including a slidably mounted sleeve member positioned adjacent the conversion material, an envelope member positioned between the inlet chamber and the conversion material through which the fluids flow, said envelope being affixed at one end to the sleeve member, and resilient means for urging the sleeve toward the conversion material said resilient means being constructed and arranged so as to allow expansion of the tank by the slidable movement of the sleeve in response to the pressure of the fluids conversion material.

2. A fluid treatment apparatus as claimed in claim 1 wherein the resilient means further includes a helical spring positioned in the inlet chamber for urging the sleeve toward the conversion material.

3. A fluid treatment apparatus as claimed in claim 2 wherein the envelope supports one of the perforated members.

References Cited
UNITED STATES PATENTS

| | | | |
|---|---|---|---|
| 2,335,657 | 11/1943 | Eweson | 210—282 |
| 3,087,504 | 4/1963 | Geschka | 210—190 X |
| 3,180,825 | 4/1965 | Couvreur et al. | 210—350 X |
| 3,254,771 | 6/1966 | Sicard | 210—282 X |

SAMIH N. ZAHARNA, Primary Examiner

U.S. Cl. X.R.

210—282, 352

PO-1050
(5/69)

UNITED STATES PATENT OFFICE
CERTIFICATE OF CORRECTION

Patent No. 3,517,816          Dated June 30, 1970

Inventor(s) JOHANNES HOPPEN

It is certified that error appears in the above-identified patent and that said Letters Patent are hereby corrected as shown below:

Col. 2, line 12, "resect" should be --respect--;

IN THE CLAIMS

Claim 1, line 21, delete "fluids".

Signed and sealed this 26th day of September 1972.

(SEAL)
Attest:

EDWARD M. FLETCHER, JR.          ROBERT GOTTSCHALK
Attesting Officer          Commissioner of Patents